United States Patent Office 3,660,296
Patented May 2, 1972

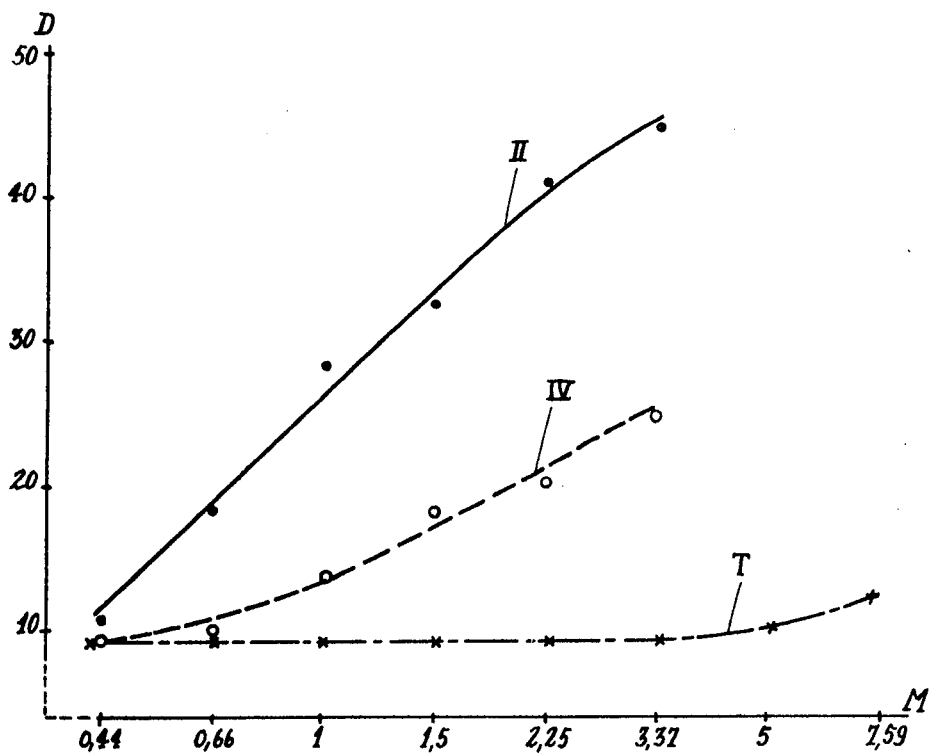

---

3,660,296
DETERGENT AND ANTISEPTIC COMPOSITIONS COMPRISING A STOCK SOLUTION OF 3,4,4'-TRICHLOROCARBANILIDE AND PROCESS FOR THE PREPARATION OF THE STOCK SOLUTION
Maurice Lavril, Paris, France, assignor to Etablissements Clin-By la, Paris, France
Filed June 19, 1969, Ser. No. 834,637
Claims priority, application France, June 28, 1968, 157,133; July 5, 1968, 158,080
Int. Cl. C11d 3/48
U.S. Cl. 252—106                      2 Claims

ABSTRACT OF THE DISCLOSURE

Detergent and antiseptic composition comprising a stock solution of 3,4,4'-trichlorocarbanilide characterized in that the stock solution includes a solubilizing agent for 3,4,4'-trichluorocarbanilide compatible with a subsequent aqueous dilution.

---

In a preferred embodiment, the solubilizing agent is dodecylbetaine or oxy-ethylenated castor oil and the stock solution diluted with pure water contains substantially 5% 3,4,4'-trichlorocarbanilide.

The invention comprises also a process for the preparation of the stock solution for the composition above referred to. The process is characterized in that, to an aqueous solution of the solubilizing agent, is added a quantity of 3,4,4'-trichlorocarbanilide corresponding to the saturation of that solution and in that the resulting solution is boiled under reflux for over 1 hour.

This invention relates to detergent and antiseptic compositions and, in particular, to antiseptic medicinal soaps comprising a stock solution of 3,4,4'-trichlorocarbanilide, which may be used, in particular, in cosmetology and for cutaneous hygiene.

The invention also relates to the process for the preparation of the stock solution for these compositions.

3,4,4'-trichlorocarbananilide $$(Cl_2C_6H_3-NH-CO-NH-C_6H_4Cl)$$

is an already known compound which is currently being used for its bacteriostatic, bactericidal and antifungous properties in cosmetics and hygiene. This compound is also used in hospitals against resistant bacteria such as those belonging to the class staphylococcus aureus which cannot be destroyed by antibiotics such as the tetracyclines, streptomycin, penicillin, chloramphenicol and the sulfonamides. This compound is a white odorless powder melting at 250° C. and is insoluble in water; it is slightly soluble in glycerine, ethanol, methyl phthalate (1 p. 100), cotton-seed oil (0.5 p. 100), propylene glycol (1 p. 100), acetone (4 p. 100), dioxane (2 p. 100); it is more soluble in methanol, dimethylsulfoxide and dimethylformamide (35 p. 100), oxy-ethylenated castor oil (5 p. 100), oxy-ethylenated dodecylphenol and oxy-ethylenated nonylphenol (15 p. 100). In the formulations, it is often used in concentrations ranging from 0.5 to 2% and its antibacterial activity, which remains high even after a considerable dilution, persists for a long time due to its substantive power with respect to skin and clothing. It does not cause any irritation and is very stable.

When presented in micronized form, 3,4,4'-trichlorocarbanilide is easily incorporated, by simple mixing, into solid preparations such as toilet soaps.

On the other hand, its incorporation into liquid preparations leads to poor results. Indeed, the various solvents which are usually employed all have the disadvantage of providing solutions from which 3,4,4'-trichlorocarbanilide precipitates as soon as they are diluted with water or put into contact with it. This leads to lower activity through a decrease in the solubilized fraction and also makes it impossible to accurately determine the locally active doses.

Attempts have been made to correct this drawback by using a third solvent such as methanol, acetone, and oxy-ethylenated products. But in such a case, the foaming effect of the preparation is seriously lessened and this is another disadvantage.

The object of the invention is to correct the above-mentioned drawbacks.

In accordance with this invention, the detergent and antiseptic composition comprising a stock solution of 3,4,4'-trichlorocarbanilide is characterized in that the stock solution includes a solubilizing agent for 3,4,4'-trichlorocarbanilide compatible with a subsequent aqueous dilution.

According to a first preferred embodiment, the solubilizing agent is a surface active compound of amphoteric nature which is dodecylbetaine.

Dodecylbetaine with an internal salt structure is a known compound having the formula

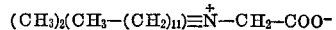

The presence of a positive charge on the quaternary ammonium group and of a negative charge on the anion of the carboxylic group makes it possible to consider dodecylbetaine as an amphoteric substance.

Dodecylbetaine has a good wetting and emulsifying power as well as a high foaming capacity which is unaffected by hard waters. It is highly soluble in water and in solution it is compatible at all pH's with anionic, cationic and non-ionic surface active agents. Furthermore, it has its own bactericidal power like all quaternary ammonium salts.

Dodecylbetaine, is commonly marketed in solution under the name Dehyton AB 30 and its composition is as follows:

| | Percent |
|---|---|
| Active ingredients (dodecylbetaine) | Approximately 30 |
| Sodium chloride | Approximately 6 |
| Water | Approximately 64 |

The stock solution preferably consists of this dodecylbetaine aqueous solution in which 3,4,4'-trichlorocarbanilide is dissolved in a proportion which at most is equal to 5%, this maximum concentration corresponding to saturation.

This stock solution is clear and stable and its pH ranges from 6.5 to 7.

Its 3,4,4'-trichlorocarbanilide concentration is preferably 5%.

The anionic, cationic and non-ionic detergents are profitably soluble in this stock solution due to the dodecylbetaine of amphoteric character which it contains. Furthermore, it has detergent and bactericidal properties which are due to the dodecylbetaine and 3,4,4'-trichlorocarbanilide.

According to a second similarly preferred embodiment the solubilizing agent for 3,4,4'-trichlorocarbanilide is oxy-ethylenated castor oil marketed under the trade mark Cremophor EL. In this case, the stock solution consists of the oxy-ethylenated castor oil itself, in which 3,4,4'-trichlorocarbanilide is dissolved in a proportion which at most is equal to 5%, this maximum concentration corresponding to saturation.

Solubilization can be carried out without heating, but the solution thus obtained leads to precipitation as a result of dilution with water. On the other hand, the solution is stable if it is prepared by boiling under reflux for over an hour.

The concentration of 3,4,4'-trichlorocarbanilide in this other stock solution is preferably here also approximately 5%.

A surprising result has been noted, namely, that the above-mentioned stock solutions do not become cloudy nor precipitate as a result of dilution with water: they remain stable and clear. This remarkable stability with respect to aqueous dilution in all proportions enables them to maintain a high antiseptic activity, which is distinctly superior to that of suspensions and solutions which are unstable with respect to dilution and which contain 3,4,4'-trichlorocarbanilide at the same concentrations. This advantage may be attributed to the fact that the uniformly dispersed antiseptic is entirely usable and moreover, as will be seen later, to the fact that an interaction between the antiseptic and its solvent medium gives rise to a synergistic effect which enhances the bacteriostatic power of this antiseptic.

The antiseptic medicinal soap comprising a stock solution according to the invention consists advantageously of the stock solution, diluted or undiluted, in liquid form. It may also consist andvantageously of an association of the stock solution with various constituents thus making it possible to obtain solid forms.

The proportion of 3,4,4'-trichlorocarbanilide varies according to the trading forms. It varies substantially from 0.5 to 5% of the weight of medicinal soap.

According to a preferred embodiment, the process for the preparation of the stock solution is characterized in that, to an aqueous solution of the solubilizing agent, is added a quantity of 3,4,4'-trichlorocarbanilide corresponding to the saturation of that solution and in that the resulting solution is boiled under reflux for over an hour.

The solubilizing agent is preferably an aqueous solution of dodecylbetaine containing 30% active ingredient or oxy-ethylenated castor oil and the preparation of the stock solution is advantageously carried out using the following laboratory method which is employed here for the preparation of 1 kg. of stock solution.

Example A.—In a 2 liter round bottom flask provided with an upward condenser, are placed:

50 g. of 3,4,4'-trichlorocarbanilide
950 g. of 30% dodecylbetaine
several fragments of pumice or carborundum.

The mixture is brought to boiling. This boiling is maintained at reflux, during 2 hours, the temperature ranging from 100 to 102° C. The mixture is then filtered while hot and a clear solution is obtained.

The 5% stock solution obtained from this particular embodiment of the invention was tested in comparison with 5% 3,4,4'-trichlorocarbanilide solutions in methanol, dimethylsulfoxide, dimethylformamide, oxy-ethylenated castor oil, a non-ionic detergent of the oxy-ethylenated dodecylphenol type, a non-ionic detergent of the oxy-ethylenated nonylphenol type and an oxy-ethylenated ammonium laurylsulfate. All of these solutions were successively diluted with distilled water to ½, ⅓ and ⅕. The results of this testing are given in the following table:

| Solvents | Dilution | | |
|---|---|---|---|
| | ½ | ⅓ | ⅕ |
| Methanol | Immediate precipitation. | Immediate precipitation. | Immediate precipitation. |
| Dimethylsulfoxide. | ----do---- | ----do---- | Do. |
| Dimethylformamide. | ----do---- | ----do---- | Do. |
| Cremophor EL (oxy-ethylenated castor oil). | No cloudiness at the beginning, precipitation after 6 hr. | Cloudiness at the beginning, precipitation after 6 hr. | Cloudiness at the beginning, precipitation after 6 hr. |
| Sterox DJ (nonionic detergent of the oxy-ethylenated dodecylphenol type. | Cloudiness at the beginning, precipitation after 6 hr. | ----do---- | Do. |
| Sterox NJ (nonionic detergent of the oxy-ethylenated nonylphenol type). | Cloudiness at the beginning, decantation after 6 hr. precipitation after 24 hr. | Cloudiness at the beginning, decantation after 6 hr., precipitation after 24 hr. | Do. |
| Lauryl LA (poly-oxy-ethylenated ammonium lauryl-sulfate containing 30% active ingredients). | Cloudiness at the beginning followed by precipitation. | Cloudiness at the beginning followed by precipitation. | Cloudiness at the beginning followed by precipitation. |
| Stock solution according to the invention. | Clear solution. | Clear solution. | Clear solution. |

This testing shows that the saturated stock solution according to the invention remained clear at all dilutions. On the other hand, all the other solutions used in comparison, immediately showed precipitation when diluted or showed an immediate cloudiness followed more or less rapidly by precipitation of 3,4,4'-trichlorocarbanilide.

Example B.—In a one liter flask provided with a reflux condenser, are mixed:

250 ml. of oxy-ethylenated castor oil and 12.5 of trichlorocarbanilide.

The mixture was placed on a heating magnetic stirrer; the solution became clear after 45 minutes; the temperature was then 67° C.

This mixture was boiled at approximately 108° C. for 2 hours. The specific gravity of the cooled solution was 1.079.

According to a first preferred embodiment, not specifically pharmaceutical in character, the detergent and antiseptic composition according to the invention comprises a dilution of the stock solution with purified water.

Such compositions are in the form of a clear liquid whose detergent power is due to dodecylbetaine and whose antiseptic power is due to the additive action of dodecylbetaine and 3,4,4'-trichlorocarbanilide.

The quantity of 3,4,4'-trichlorocarbanilide contained in the previously mentioned liquid compositions advantageously ranges from 0.5 to 4% and preferably from 0.5 to 2%.

These compositions are advantageously used as liquid soaps for disinfection and cleansing. Due to their stability during dilution with water, it is possible to obtain a uniform distribution of the antiseptic agents which they contain and therefore, they are much more active than the usually employed suspensions.

According to a second preferred embodiment, which is also not specifically pharmaceutical in character, the detergent and antiseptic composition, according to the invention, comprises an association of the stock solution with various ingredients so as to constitute cosmetological and hygienic products.

These ingredients may be soaps, glycerine, sorbitol, polyethylene glycol, stearic acid, fatty sulfonated alcohols, soluble celluloses, titanium oxide, castor oil, this enumeration being obviously of a nonlimiting nature.

The quantity of 3,4,4'-trichlorocarbanilide contained in the above formulations advantageously ranges from 0.05 to 0.5%.

These cosmetological and hygienic formulations may be obtained in widely varying trading forms such as deodorizing soap cakes, lotions, shampoos, gels, creams, aerosol bombs and liquid soaps.

The following numerical examples of compositions, according to the invention, in liquid form are given.

Example 1.—Liquid disinfectant soap for cleaning glassware and equipment used in bacteriology, surgery and stomatology:

| | P. 100 |
|---|---|
| Dodecylbetaine solution containing 5% 3,4,4'-trichlorocarbanilide | 30 to 80 |
| Eucalyptus oil | 2 |
| Purified water—q.s. 100 | |

Example 2.—Liquid detergent for cleaning floors, walls, laboratory benches:

| | P. 100 |
|---|---|
| Dodecylbetaine solution containing 5% 3,4,4'-trichlorocarbanilide | 10 to 30 |
| Citronella oil | 1 |
| Purified water—q.s. 100 | |

Other numerical examples are also given below of compositions, according to the invention, for the formulation of cosmetological and hygienic articles.

Example 3.—Deodorizing soap cake:

Dodecylbetaine solution containing 5% 3,4,4'-trichlorocarbanilide neutralized to pH 7—5 p. 100
Perfume—quantity to impart a pleasant odor
Soap chips—q.s. 100

Example 4.—Deodorizing soap cake, with acid component:
The ingredients are mixed by extruding.

| | P. 100 |
|---|---|
| Dodecylbetaine solution containing 5% 3,4,4'-trichlorocarbanilide at pT: 6.5 | 5 |
| Polyethylene glycol 4000 | 20 |
| Dehydrated protein soap | 50 |
| Perfume—quantity to impart a pleasant odor | |
| Stearic acid—q.s. 100 | |

Example 5.—Deodorizing soap cake, with neutral component:

| | P. 100 |
|---|---|
| Dodecylbetaine solution containing 5% 3,4,4'-trichlorocarbanilide, neutralized to pH: 7 | 5 to 10 |
| Sodium laurylsulfate | 50 |
| Starch | 10 |
| Stearic acid | 10 |
| Pefume—quantity to impart a pleasant odor | |
| Polyethyleneglycol—q.s. 100 | |

Example 6.—After-shave lotion:

| | P. 100 |
|---|---|
| Dodecylbetaine solution containing 5% 3,4',4'-trichlorocarbanilide at pH: 6.5 | 1 to 5 |
| Menthol | 0.5 |
| Glycerine | 10 |
| Perfume—quantity to impart a pleasant odor | |
| 60° ethyl alcohol—q.s. 100 | |

Example 7.—Massage lotion:

| | P. 100 |
|---|---|
| Dodecylbetaine solution containing 5% 3,4,4'-trichlorocarbanilide, at pH: 6.5 | 1 to 5 |
| Glycerine or sorbitol | 10 to 20 |
| Perfume—quantity to impart a pleasant odor | |
| 80° ethyl alcohol—q.s. 100 | |

Example 8.—Liquid deodorizing and antiseptic soap:

| | P. 100 |
|---|---|
| Dodecylbetaine solution containing 5% 3,4,4'-trichlorocarbanilide, at pH 6.5 | 1 to 10 |
| Aqueous 30% dodecylbetaine solution (Dehyton AB 30) | 10 to 20 |
| Protein soap | 20 to 50 |
| Perfume—quantity to impart a pleasant odor | |
| Purified water—q.s. 100 | |

Example 9.—Antiseptic cream shampoo:

| | P. 100 |
|---|---|
| Dodecylbetaine solution containing 5% 3,4,4'-trichlorocarbanilide, at pH: 7 | 1 to 10 |
| Aqueous 30% dodecylbetaine solution (Dehyton AB 30) | 10 to 20 |
| Sodium laurylsulfate | 1 to 5 |
| Protein soap | 20 to 30 |
| Lauric acid diethanolamide | 5 to 10 |
| Carboxymethylcellulose | 1 |
| Perfume—quantity to impart a pleasant odor | |
| Purified water q.s. 100 | |

Example 10.—Liquid antiseptic shampoo:

| | P. 100 |
|---|---|
| Dodecylbetaine solution containing 5% 3,4,4'-trichlorocarbanilide, at pH 6.5 | 1 to 10 |
| Sodium ethylene-diamine tetracetate | 1 to 2 |
| 30% Aqueous dodecylbetaine solution (Dehyton AB 30) | 10 |
| Perfume—quantity to impart a pleasant odor | |
| Purified water—q.s. 100 | |

Example 11.—Antiseptic talc:

| | P. 100 |
|---|---|
| Dodecylbetaine solution containing 5% 3,4,4'-trichlorocarbanilide, at pH: 6.5 | 1 to 5 |
| Titanium oxide | 5 to 10 |
| Perfume—quantity to impart a pleasant odor | |
| Talac—q.s. 100 | |

Example 12.—Antiseptic and deodorizing gel:

| | P. 100 |
|---|---|
| Dodecylbetaine solution containing 5% 3,4,4'-trichlorocarbanilide, at pH: 6.5 | 1 to 5 |
| Ethylhydroxyethyl cellulose | 2 |
| Perfume—quantity to impart a pleasant odor | |
| Purified water—q.s. 100 | |

Example 13.—Antiseptic and deodorizing aerosol bomb:

| | P. 100 |
|---|---|
| Dodecylbetaine solution containing 5% 3,4,4'-trichlorocarbanilide, at pH: 6.5 | 1 to 10 |
| Castor oil | 10 |
| Perfume—quantity to impart a pleasant odor | |
| 95° ethyl alcohol—q.s. 100 | |
| Propellent gas—q.s. | |

Example 14.—Antiseptic and deodorizing cream:

Dodecylbetaine solution containing 5% 3,4,4'-trichlorocarbanilide, at pH: 6.5—1 to 10 p. 100
Perfume—quantity to impart a pleasant odor
Polyethyleneglycol ointment, USP XVII—q.s. 100

It is self-evident that the invention is not limited to to the above-mentioned examples, but that it embraces all variations. In particular, the dodecylbetaine stock solution containing 5% 3,4,4'-trichlorocarbanilide may be incorporated into numerous other ingredients or vehicles used in dermatology.

In the more particularly pharmaceutical field, the following special formulas are given as examples:
The preferred forms are as follows:

Formula 1

|  | P. 100 |
|---|---|
| Concentrated stock solution containing 3,4,4'-trichlorocarbanilide in dodecylbetaine | 5 |

Formula 2
Adjusted to pH 8

|  | P. 100 |
|---|---|
| 2.5% 3,4,4'-trichlorocarbanilide stock solution in dodecylbetaine | 20 |
| Celon E (sodium ethylene-diamine tetracetate) | 1 |
| Maypon 4CT (triethanolamine salt of a condensation product of a fatty coconut acid with a polypeptide and amino acid complex) | 20 |
| Oramide DL 200 (lauric acid diethanolamide) | 2 |
| Water—q.s. | 100 |

In this latter formula, the Oramide content can range from 0.5 to 5% depending on the desired consistency.

Similarly, depending on the desired foaming power, the stock solution content can be increased from 20 to 40% or the Maypon 4 CT content can be increased from 20 to 70%.

Formula 3

Concentrated stock solution containing 5% 3,4,4'-trichlorocarbanilide in oxy-ethylenated castor oil.

Formula 4

|  | P. 100 |
|---|---|
| Concentrated stock solution containing 5% 3,4,4'-trichlorocarbanilide in oxy-ethylenated castor oil | 10 |
| Celon E | 1 |
| Maypon 4 CT | 30 |
| Sipon LK6 (sodium laurylsulfate) | 5 |
| Water—q.s. | 100 |

Various adjuvants may be added to Formulas 1 to 4 leading to various liquid or solid pharmaceutical forms.

The pharmacological characteristics of the medicinal soap according to the invention will now be exposed.

(1) ACUTE TOXICITY

The tests were carried out on mice using a medicinal soap of Formula n° 2.

This form containing, 0.5% 3,4,4'-trichlorocarbanilide, showed little oral toxicity. The lethal dose (DL 50) could not be reached due to the fact that this dose exceeded, for mice, the maximum administrable quantity of 25 ml. per kg. of body weight.

(2) LOCAL TOLERANCE

The tests were carried out on rabbits and rats using medicinal soaps of Formulas 2 and 4.

These soaps were applied once on the eye of these animals and then for a prolonged period of time on the depiliated or shaved skin of their flanks. The depilated skin of the rabbits from the chosen strain was very sensitive, even to ordinary soap, in the first days following depilation.

The results of these tests are summarized in the following table:

| Formula | Eye (1 application) | Flank skin Rabbit | Flank skin Rat |
|---|---|---|---|
| 1 | Rapidly reversible conjunctival irritation. | Excellent tolerance on shaved skin after 3 weeks of treatment, very weak drying effect on depilated skin, reversible in several days, normal healing of scarified zones. | Excellent tolerance on shaved skin after 3 weeks of treatment, very weak drying effect on depilated skin, reversible in several days. |
| 2 | Rapidly reversible moderate irritation. | do | Do. |

These tests show that the medicinal soap is well tolerated, practically does not dry the skin and that the antiseptic power of this soap allows healing of the scarified zones.

The bacteriostatic properties of the medicinal soap, according to the invention, are in turn discussed in reference to the appended drawing in which the sole figure is a diagram illustrating said properties of this soap.

The test used was Jacquet's test which consists in measuring inhibition diameters on agar-agar plates previously seeded within their mass and out of which alveoles have been cut in order to place therein the preparation to be studied or a dilution of the latter. The micro-organism chosen was Bacillum cereus. The incubation temperature was 37° C.

The tests were carried out on cloudy dilutions of 3,4,4'-trichlorocarbanilide suspended in distilled water, obtained from a 1% stock solution of this antiseptic in acetone in comparison with:

clear dilutions obtained from the stock solution according to Formula 1
clear dilutions obtained from the stock solution according to Formula 3
dilutions obtained from Formulas 2 and 4.

The diameter of the alveoles cut out of the agar-agar plates was 9 mm. The bacteriostatic activity was expressed in inhibition diameters after 24 hours, these diameters being measured in millimeters.

The results of these tests are summarized in the following table:

| Trichlorocarbanilide dose (in micrograms) | Trichlorocarbanilide in distilled water | Formula 1 | Formula 2 | Formula 3 | Formula 4 |
|---|---|---|---|---|---|
| 7.59 | 12 | >40 | (¹) | | |
| 5.06 | 10 | >40 | (¹) | | |
| 3.37 | 9 | >40 | 45 | 23 | 25 |
| 2.25 | 9 | >37 | 41.5 | 18 | 20.5 |
| 1.5 | 9 | >32 | 33.5 | 17 | 17.5 |
| 1 | 9 | 32 | 28 | 18 | 14.5 |
| 0.66 | 9 | 25 | 18 | 13 | 10 |
| 0.44 | 9 | 20 | 11 | 12 | 9 |

¹ Excessively broad diameter difficult to measure.

This table shows that 3,4,4'-trichlorocarbanilide suspended in distilled water begins to have a distinct bacteriostatic effect at a dose of 5.06 micrograms only, while it already has a distinct effect at a dose of 0.44 microgram when the dilution originates from an oxyethylenated castor oil stock solution (Formula 3).

Its effect is even stronger when the dilution is prepared from a dodecylbetaine stock solution (Formula 1). The progression of the effect as a function of dosage is also, in this case, much faster, which confirms the presence of a synergistic effect. It should be noted that this synergistic effect is not influenced by dodecylbetaine's own antiseptic power which is nil at the doses studied.

Formulas 2 and 4 which are derived respectively from Formulas 1 and 3, show lower activities than the latter at the lowest doses ranging from 0.44 to 1 microgram. However, these activities subsequently become substantially equivalent and, as far as Formula 2 is concerned, eventually reach higher levels than those of Formula 1.

The synergistic effect obtained by the previous solubilization of 3,4,4'-trichlorocarbanilide in a stock solution is clearly illustrated in the diagram of the appended drawing. In this diagram the inhibition diameters D, expressed in mm., were plotted as ordinates and the doses M of 3,4,4'-trichlorocarbanilide, expressed in micrograms, were plotted as abscissas. The control activity curve T of 3,4,4'-trichlorocarbanilide, suspended in water, and the activity curves (II and IV) of the medicinal soaps, corresponding respectively to 2 and 4, are shown in the drawing.

This diagram shows that Formula 2 is more active than Formula 4 and that these two formulas are distinctly more active than the control activity curve T.

Indications

The medicinal soap according to the invention may be used in dermatology.

More specifically, the formulas comprising dodecylbetaine have the following indications:

Formula 1 relating to the concentrated stock solution containing 5% antiseptic is particularly active for the treatment of infected dermatosis, mycosis and furunculosis.

Formula 2 comprising 0.5% antiseptic constitutes a maintenance treatment and a preventive treatment for relapsing previous affections.

This latter formula is particularly active on gram positive bacteria. It makes it possible to efficiently clean surgeons', physicians', dentists' and veterinarians' hands and to effect also pre-operative washings.

The formulas comprisnig oxy-ethylenated castor oil have the same general indications as the formulas based on dodecylbetaine. However, the oxy-ethylenated castor oil formulas have a lower detergent power and, as a result, have a lower drying effect on the skin. The latter should therefore be used preferentially whenever detergent or foaming action is of secondary interest.

I claim:

1. A process for the preparation, in the form of a stock solution which can be diluted with water without any tendency to precipitate, of a germicidal detergent composition of 3,4,4'-trichlorocarbanilide and dodecylbetaine, said process comprising adding to an aqueous solution containing about 30% by weight of dodecylbetaine, 3,4,4'-trichlorocarbanilide in an amount not exceeding 5% by weight of said solution, and boiling the resulting solution under a reflux at least one hour.

2. A process as claimed in claim 1, in which said 3,4,4'-trichlorocarbanilide is present in an amount about 0.5 to 5% by weight of said solution.

References Cited

UNITED STATES PATENTS

| | | | |
|---|---|---|---|
| 2,846,398 | 8/1958 | Beaver et al. | 252—106 |
| 3,346,503 | 10/1967 | Huggins | 252—106 |
| 3,431,207 | 3/1969 | Russell | 252—106 |
| 3,451,937 | 6/1969 | Quimby | 252—137 X |
| 3,489,686 | 1/1970 | Parran | 252—106 |
| 3,507,796 | 4/1970 | Voss | 252—137 X |

HERBERT B. GUYNN, Primary Examiner

H. A. PITLICK, Assistant Examiner

U.S. Cl. X.R.

252—107, 363.5, 46; 424—316, 322